(12) United States Patent
P et al.

(10) Patent No.: US 10,846,264 B2
(45) Date of Patent: Nov. 24, 2020

(54) RULE-BASED ARCHIVING OF CLOUD FILES

(71) Applicant: SAP SE, Walldorf (DE)

(72) Inventors: Suresh Kumar P, Nandyal (IN); Vijay Kumar, Bangalore (IN); Bhuvaneswari D, Oddanchatram (IN); Kishan Rao Ramesh Yaradi, Bangalore (IN); Ankit Jain, Bhopal (IN)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 16/007,155

(22) Filed: Jun. 13, 2018

(65) Prior Publication Data

US 2019/0384829 A1    Dec. 19, 2019

(51) Int. Cl.
*G06F 16/00*    (2019.01)
*G06F 16/11*    (2019.01)

(52) U.S. Cl.
CPC .......... *G06F 16/125* (2019.01); *G06F 16/113* (2019.01)

(58) Field of Classification Search
CPC .............................. G06F 16/125; G06F 16/113
See application file for complete search history.

(56) References Cited

U.S. PATENT DOCUMENTS

| | | | |
|---|---|---|---|
| 2002/0104022 A1* | 8/2002 | Jorgenson | H04L 29/06 726/12 |
| 2009/0112967 A1* | 4/2009 | Amano | G06F 21/6218 709/201 |
| 2010/0106689 A1* | 4/2010 | Huslak | G06F 16/125 707/662 |
| 2013/0036100 A1* | 2/2013 | Nagpal | G06F 16/1748 707/692 |
| 2013/0110985 A1* | 5/2013 | Shekher | H04L 67/18 709/219 |

* cited by examiner

*Primary Examiner* — Cheryl Lewis
(74) *Attorney, Agent, or Firm* — Sterne, Kessler, Goldstein & Fox P.L.L.C.

(57) ABSTRACT

Disclosed herein are system, method, and computer program product embodiments for routing and storing files. In an embodiment, a file router system may route files to different geographic locations. This routing may aid in adhering to government regulations pertaining to the archival of files. For example, the file router system may interface with and/or receive files from a cloud computing platform. The file router system may manage the geographic file storage location. The file router system may also determine a file retention plan. The file retention plan may indicate a file retention period. The file router system may transmit the file retention plan to a data storage center located in the geographic file storage location. The file retention plan may further aid in adhering to government regulations.

20 Claims, 5 Drawing Sheets

RULE-BASED ARCHIVING OF CLOUD FILES

BACKGROUND

As companies move toward generating and manipulating computer files, they face regulations regarding the retention of these files. Different countries may specify different regulations for the handling of files as they may contain sensitive information. These regulations may require the deletion or archival of files. At times, regulations may require the archival of files for electronic invoicing. Electronic invoicing may refer to the registration and/or production of archived files if requested by a government entity. For example, regulations may require the retention of electronic invoices for a duration determined by tax authorities. These retention periods may last for years. Further, some regulations may require the storage of files in a particular geographic region so that they are accessible for auditing. As companies expand, become multinational in scope, and/or utilize more advanced cloud computing technologies, adhering to these regulations becomes difficult.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
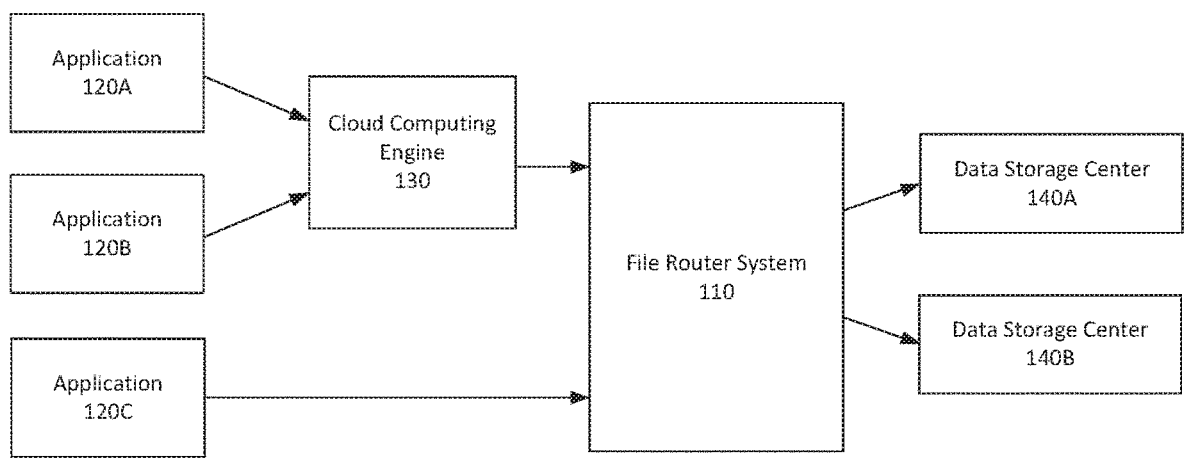
FIG. 1 depicts a block diagram of a file routing environment, according to some embodiments.

Provided herein are system, apparatus, device, method and/or computer program product embodiments, and/or combinations and sub-combinations thereof, for routing and/or storing files and documents.

In an embodiment, a file router system may receive data and/or files and determine a storage location for the received data and/or files. For some embodiments, this disclosure may use the term "file" to denote a unit of data but may also refer to raw data. Examples of files may include complete files, documents, invoices, raw data, information filled into a form, images, video, audio, and/or other categories of data. The file router system may be a web and/or cloud-based service configured to interface with multiple clients and/or applications. The file router system may interface with various data storage centers hosted in different geographic locations. These locations may be (or endeavor to be) compliant with local tax regulations. After receiving a file from an application, the file router system may analyze the file to identify a characteristic of the file indicating the appropriate storage location. For example, the file may indicate a particular country as the source of the file. In an embodiment, the file router system may then apply administrator-defined mapping rules and/or mapping rules formulated based on country regulations to determine a geographic storage location for the file. The file router system may then transmit the file to a data storage center in the determined geographic storage location.

In an embodiment, an administrator may define the rules for the file router system. The administrator may utilize a graphical user interface to configure the routing rules. For example, an administrator may generate mappings from file characteristics to a geographic location of file storage, a retention period, and/or a classification of the data. In this manner, an administrator may define rules and configurations to route files. The administrator may define retention parameters, such as, for example, the length of time to retain a file. These location and/or retention period parameters may follow regulations defined by a government authority. In a non-limiting example, an administrator may define a parameter stating that a German-sourced document will be routed to a data center hosted in Germany for storage and that the retention period for a German-sourced document is ten years.

An administrator may define parameters according to policies defined within a company. These parameters may be arbitrary and/or may not follow a government-defined regulation. For example, an administrator may define a parameter that indicates a particular city rather than a country. An administrator may also define a retention period longer than a retention period specified by a regulation. In an example where a regulation may specify a time period within which a file must be archived, the administrator may define an archiving queue time that causes the archiving to occur before the time period has elapsed. An administrator may also modify a parameter after defining an initial parameter.

In an embodiment, an administrator may define different parameters for different data types. For example, the location of storage and/or the retention period may differ depending on whether a file is an employment contract, employee personal information, or a transaction receipt.

In addition to the storage of files, the file router system may act as a medium for the search and retrieval of archived files. A consumer may perform a search using parameters, such as, for example, a file content identifier, a file type, and/or a date or range of dates. The dates may refer to a date of file creation, a file edit date, and/or file archival dates. By allowing this type of searching, the file router system may be configured to retrieve files from data centers hosted at different geographic locations. The file router system may act as an application programming interface (API). In this case, the file router system may integrate the storage of files as well as the retrieval of files for a client accessing the file router system via a client application. For example, the client application may be a cloud computing application configured to interface with the file router system to archive files generated in the cloud computing application.

Using the file router system, companies may automate the retention of files. The file router system may designate the appropriate geographic location for storage and/or designate a retention period. This automation may aid companies with regulatory compliance. In an embodiment, because the file router system may be configured to transmit and/or store files in multiple countries, the file router system may be adapted to aid multinational corporations in the routing of files. Further, because the file router system may be configured to integrate with cloud computing applications, a company may utilize a cloud computing interface for user computing while the file router system manages the storage and retention of cloud-created files. A multinational company may utilize a cloud computing interface accessible by users from multiple countries. Despite the disparate user locations, the file router system may route the files to the corresponding geographic locations and/or retain the files for a specified retention period to aid in regulatory compliance.

These features of example embodiments will now be discussed in greater detail with respect to the corresponding figures.

FIG. 1 depicts a block diagram of a file routing environment 100, according to some embodiments. File routing environment 100 may include a file router system 110. File router system 110 may communicate with applications 120A-120C and/or cloud computing engine 130. File router system 110 may receive files from application 120A-120C and/or cloud computing engine 130 for file retention. File router system 110 may analyze received files to determine which data storage center 140A or 140B to store the received file. File router system 110 may also formulate a file retention plan. The file retention plan may include a retention period and/or a classification of data. The file retention plan may include user identification information indicating the source of the file. Data storage center 140 may receive the file and/or file retention plan from file router system 110. Using the retention plan, data storage center 140 may store the file for archiving for a designated retention period. Data storage center 140 may store the file in a memory space corresponding to the user identification information. In this manner, file router system 110 may be configured to act as a centralized routing system to route files from applications 120A-120C to different data storage centers 140A-140B.

File router system 110 may include one or more processors, memory, databases, servers, routers, modems, and/or antennae configured to receive and/or retrieve files. Files may include complete files, documents, invoices, raw data, information filled into a form, images, video, audio, and/or other data types. File router system 110 may include subsystems configured to provide Internet connections between applications 120A-120C, cloud computing engine 130, and/or data storage centers 140A-140B. The discussion herein with respect to FIG. 2 describes an embodiment of subsystems within a file router system 110.

File router system 110 may interface with a cloud computing engine 130. File router system 110 may communicate with cloud computing engine 130 via an API. Cloud computing engine 130 may transmit files to file router system 110 so that file router system 110 may archive the files in a specified location and/or for a specified amount of time. In an embodiment, the communication between cloud computing engine 130 and file router system 110 may utilize a two-way communication protocol. For example, when file router system 110 receives a file from cloud computing engine 130, file router system 110 may transmit an acknowledgement notification to cloud computing engine 130.

In an embodiment, file router system 110 may be integrated with cloud computing engine 130. For example, a client may utilize cloud computing engine 130 for cloud computing and/or manipulation of cloud-based files. A client may use application 120A or 120B for this interface. In some embodiments, application 120A or 120B may be a software application and/or an Internet browser configured to facilitate access to cloud computing engine 130. Applications 120A and 120B may also differ and utilize different software operations.

In an embodiment, when a client utilizes cloud computing engine 130 via applications 1120A-1120B, file router system 110 may classify generated files. This classification may indicate the location for storing the file and/or the retention period for the files. An administrator of file router system 110 may specify parameters for routing files to specific data storage centers 140. These parameters may include mappings for retention periods. The parameters may map file content identifiers to locations and/or retention periods. For example, a file content identifier may be a source location, content elements of the file, an identifier indicating the type of content contained within the file, a language associated with file, a file type and/or extension, metadata associated with the file, and/or other file identifiers indicating a classification of the file. Based on the interfacing of file router system 110 with cloud computing engine 130, cloud computing engine 130 may provide the file to the file router system 110 for classification. File router system 110 may determine a classification, storage location, and/or retention period based on administrator-defined parameters. Cloud computing engine 130 may indicate the classification, storage location, and/or retention period of the file. For example, cloud computing engine 130 may specify that a particular file be archived at a data storage center 140 located in Germany and/or for ten years. Cloud computing engine 130 may then utilize file router system 110 to route the file to the corresponding data storage center 140.

By interfacing with cloud computing engine 130, file router system 110 may provide an automated file routing service for files generated and/or manipulated using cloud computing engine 130. File router system 110 may route these cloud-based files from multiple different application 120A-120B sources and may act as a centralized routing system. For example, if a company includes subsidiaries in multiple countries, the subsidiaries of the country may be able to utilize a single cloud computing platform (cloud computing engine 130) while file router system 110 manages the storage of files. In this manner, a company may subscribe to file router system 110 for routing files.

In an embodiment, file router system 110 may be accessed directly from an application 120C. Application 120C may be a standalone software application executing on a computing device. For example, application 120C may be an installed program and/or an Internet browser configured to access file router system 110. A user accessing application 120C may wish to store a file at data storage center 140. Application 120C may upload the file to file router system 110 so that file router system 110 may store the file. File router system 110 may provide graphical user interface data to application 120C so that application 120C may generate and/or display a graphical user interface.

A user of application 120C may designate a geographic location and/or a retention period for files transmitted to file router system 110. In this case, file router system 110 may utilize the designated information to route the files to the corresponding data storage center 140. File router system 110 may be configured to automatically monitor and/or retrieve newly generated files from a local computer utilizing application 120C. For example, application 120C may act as a medium for providing cloud storage capabilities to a local computer. A script may push files from application 120C to file router system 110. In an embodiment, file router system 110 may make a call to application 120C to retrieve files stored on the local computer. Application 120C may use a script to read files from the local computer and to send the files to file router system 110. In this case, file router system 110 may retrieve files for classification and routing. A user may specify the storage location and/or retention period. In an embodiment, file router system 110 may determine the storage location and/or retention period using administrator-defined parameters.

When file router system 110 receives a file from cloud computing engine 130 and/or application 120C, file router system 110 may determine the storage location and/or retention period for the file. For example, file router system 110 may analyze the file to determine a file content identifier. File router system 110 may analyze the file according to parameters specified by an administrator. For example, an administrator may define a parameter that assigns a retention period based on the file content. In a non-limiting example, a retention period of ten years may be assigned for document files including business transaction information. File router system 110 may be configured to identify the content of the file using machine learning and/or artificial intelligence and then determine the retention period and/or geographic storage location using the administrator defined parameters. In this manner, application 120C and/or cloud computing engine 130 may not specifically dictate a geographic location or a retention period, but file router system 110 may be able to supply the geographic location or the retention period. In an embodiment, the determined geographic location and/or retention period may adhere to government regulations for document archival.

A user may utilize application 120C and/or cloud computing engine 130 for file generation and/or manipulation. File router system 110 may supply the geographic location information and/or retention period so that cloud computing engine 130 and/or application 120C need not supply the information. In this manner, a company utilizing file router system 110 may streamline the file retention process for users. Users need not explicitly designate a geographic location or a retention period. Instead, file router system 110 may be able to coordinate the storage of the file according to administrator-defined parameters. File router system 110 may be able to further coordinate the storage of files in different geographic locations corresponding to different data storage centers 140A-140B even if the location is not explicitly specified by a user creating a file.

In addition to storing a file, file router system 110 also may retrieve files stored in a data storage center 140. File router system 110 may facilitate search and/or retrieval for applications 120A-120C and/or cloud computing engine 130. File router system 110 may communicate graphical user interface data with applications 120A-120C and/or cloud computing engine 130 to allow the generation of a graphical user interface. A user may then use the graphical user interface to search for files, retrieve files, and/or view files. Retrieving a file may include downloading a copy of the file while not deleting the filed stored at a data storage center 140. This retrieval process may be utilized by a government authority to retrieve records and to monitor compliance.

When searching for a file, applications 120A-120C and/or cloud computing engine 130 may provide search parameters to file router system 110. These search parameters may include a file content identifier, a file type, and/or a date or range of dates. File router system 110 may utilize an index stored in memory of file router system 110 to determine the data storage center 140 within which the desired file is stored. File router system 110 may then retrieve the file and/or generate a copy of the file for access at the requesting application 120A-120C or cloud computing engine 130. In this manner, file router system 110 may facilitate the storage and/or retrieval of files from data storage centers 140.

In an embodiment, data storage centers 140 may include a scheduler service. As explained further with reference to FIG. 2, the scheduler service may monitor the retention period to determine when the retention period has elapsed. When the retention period has elapsed, data storage center 140 may delete the stored file. Depending on instructions within a retention plan transmitted to a data storage center 140, data storage center 140 may generate a notification sent to file router system 110. File router system 110 may then transmit the notification to the application 120 and/or cloud computing engine 130 that stored the file.

The notification may include an indication that the retention period has elapsed and/or that the retention period will elapse in a specified amount of time. The notification may include a request for instructions concerning the file. For example, the notification may allow a user to explicitly provide a deletion command and/or to extend the retention period. The notification may allow a user to specify a new retention period for the file. An administrator of file router system 110 may also respond to notifications provided by data storage center 140. In this manner, data storage centers 140 may store files for longer than the initially specified retention period.

In an embodiment, file router system 110 may maintain data related stored files and/or may store a record of the retention period. For example, file router system 110 may include a scheduler subsystem. In this manner, file router system 110 may generate and/or respond to a notification without first receiving a notification from a data storage center 140. In an embodiment, both a data storage center 140 and file router system 110 may generate a notification for redundancy.

Based on the described elements of file routing environment 100, file router system 110 is able to route files to different geographic locations and/or specify different retention periods for the files.

Figure 2:
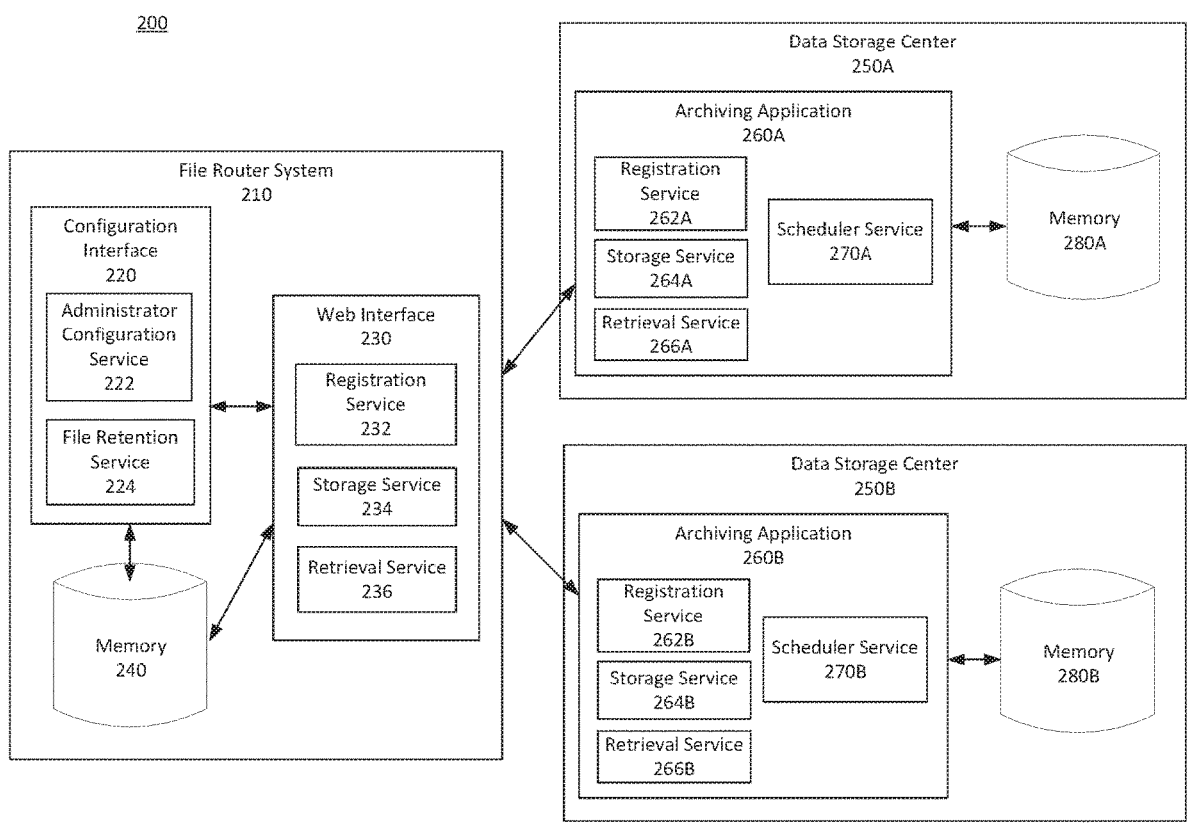
FIG. 2 depicts a block diagram of a file routing environment including archiving applications, according to some embodiments.

FIG. 2 depicts a block diagram of a file routing environment 200 including archiving applications 260A-260B, according to some embodiments. File routing environment 200 may include elements similar to file routing environment 100. For example, file router system 210 may perform operations similar to those described with reference to file router system 110. Similarly, data storage centers 250A-250B may perform operations similar to data storage centers 140A-140B.

File router system 210 may include subsystems including configuration interface 220, web interface 230, and/or memory 240. Configuration interface 220 may include hardware and/or software configured to modify file routing and/or retention parameters. Configuration interface 220 may include an administrator configuration service 222 and/or a file retention service 224. Configuration interface 220 may communicate with memory 240 and/or web interface 230 to modify routing and/or retention parameters.

An administrator may define routing and/or retention parameters using administrator configuration service 222. An administrator may remotely access file router system using the Internet and/or using web interface 230. For example, file router system 210 may be accessed as an API. An administrator may utilize a remote software application and/or an Internet browser to access file router system 210 and define parameters via administrator configuration service 222. Configuration interface 220 may store received parameters in memory 240.

In an embodiment, a user other than an administrator may define parameters for the routing and retention of files. For example, an administrator may grant permission to a user and allow the user to define parameters. The user may specify a storage location and/or a retention period associated with a particular file or many files. The user may utilize web interface 230 to define parameters to be stored in memory 240. Commands received via web interface 230 may be controlled using file retention service 224 to manage routing and/or retention parameters. For example, file retention service 224 may prioritize parameters specified by administrators over parameters specified by users. In this manner, file retention service 224 may determine the parameters to store in memory 240 and/or the particular parameters to utilize when routing a file. File retention service 224 may utilize parameters adhering to government regulations. File retention service 224 may be pre-programmed to apply these parameters after receiving a file via web interface 230.

File router system 210 may receive files from external applications and/or a cloud computing engine via web interface 230. Web interface may include a registration service 232. Registration service 232 may manage user accounts and/or online identities to manage the storage of files. For example, a user may first provide login credentials to file router system 210 prior to sending file router system 210 a file for storage. In an embodiment, registration service 232 may aid in the partitioning of memory 280 in a data storage center 250. Registration service 232 may partition the memory 280 into partitions corresponding to different user accounts.

Registration service 232 may confirm the identity of the user attempting to access file router system 210. Registration service 232 may recognize user account information such as, for example, user-defined parameters for routing and/or retaining files. For example, a particular user account may indicate that the user is located in Russia. When the user provides a document to file router system 210 via web interface 230, registration service 232 may retrieve user information stored in memory 240 to determine that the particular user is located in Russia. File router system 210 may then apply the routing and/or retention parameters associated with a Russian document. For example, the parameters may indicate that the document should be routed to a data storage center 250 located in Moscow and that the document should be retained for five years. File router system 210 may then transmit the document and/or a file retention plan to the data storage center 250 located in Moscow.

In an embodiment, file router system 210 may transfer the files via the Internet and may use web interface 230 and/or storage service 234. Storage service 234 may aid in generating a communication channel between file router system 210 and the determined data storage center 250. In an embodiment, after the transmission of the file and/or the file retention plan, storage service 234 may generate an index in memory 240 indicating the storage location for the file. Storage service 234 may also make a record indicating the retention period for the file. In this manner, file router system 210 may include a retention period record without relying on a data storage center 250 to notify file router system 210 that a retention period has elapsed.

After storing a file at a data storage center 250, file router system 210 may utilize retrieval service 236 to retrieve the stored file. File router system 210 may retrieve an archived file based on a request by a user accessing file router system 210. In an embodiment, files may be retrieved to satisfy a government authority audit. To retrieve a stored file, file router system 210 may consult an index stored in memory 240 indicating the location of the stored file. The location may indicate a particular data storage center 250. Retrieval service 236 may then query the determined data storage center 250 to obtain the file and/or a copy of the file. Using web interface 230, file router system 210 may then transmit the retrieved file to the requesting application.

To perform file storage and/or retrieval, web interface 230 may communicate with an archiving application 260 within a data storage center 250. A data storage center 250 may include one or more processors, memory, databases, servers, routers, modems, and/or antennae configured to receive, store, and/or retrieve files and/or file retention plans. A data storage center 250 may store files according to received file retention plans. An archiving application 260 may be instantiated using the hardware and/or software of a data storage center 250 to communicate with file router system 210, receive files for storage, and/or to receive file retention plans.

Communications from a file router system 210 to a particular archiving application 260 may depend on the routing parameters determined by file router system 210. For example, a routing parameter may indicate that a document originating from Germany should be stored in a data storage center 250 located in Germany. In a non-limiting example, data storage center 250A may be located in Germany while data storage center 250B may be located in Russia. If file router system 210 receives a document with Germany as an origin, file router system 210 may initiate a communication with archiving application 260A because of its location in Germany. This configuration may aid companies that are multinational. Companies may utilize a cloud computing platform accessible across many countries. The storage repositories, however, may vary across different locations. By using file router system 210, a company may facilitate the storage of files in locations to satisfy government regulations. A cloud computing configuration that includes file router system may allow for a shared cloud computing platform rather than discrete, local computing networks.

In an embodiment, in addition to transmitting a file to a data storage center 250, file router system 210 may also transmit a file retention plan. The file retention plan may be metadata and/or data accompanying the file. The file retention plan may provide commands indicating how the file should be stored. For example, the file retention plan may include a retention period to indicate the length of time the file should be stored. In an embodiment, the file retention plan may specify a location in memory 280 where the file should be stored.

For example, the file retention plan may include user identification information obtained via registration service 232. A registration service 262 within an archiving application 260 may utilize this information to determine a location in memory 280 corresponding to the user. This location in memory 280 may correspond to a partitioned memory space allocated for the particular user account. In this manner, memory 280 may be organized by users. In an embodiment, memory 280 may not be organized by users, but storage service 264 may maintain an index associating a particular file to a particular user account. The index may associate the particular file with registration data corresponding to the source user account for the file. In this manner, storage service 264 may store the file in memory 280 and maintain the file index.

In an embodiment, the file retention plan may include instructions dictating how a data storage center 250 should act when a retention period expires. For example, the file retention plan may indicate that when a retention period expires, the data storage center 250 should delete the file from memory 280. The file retention plan may indicate that the data storage center 250 should transmit a notification to file router system 210. For example, the file retention plan may indicate that after detecting that a retention period has expired, data storage center 250 should transmit a notification requesting further instructions. In an embodiment, the file retention plan may indicate that the notification should be sent prior to the expiration of the retention period. The notification may include a request for instructions. The request may include a request for an explicit command to delete the file. The notification may allow a return command to extend the retention period and/or specify a new retention period. In this case, the retention period may be altered from the initial retention period for a particular file.

Data storage center 250 may receive a file, a file retention plan, and/or updated instructions via archiving application 260. A storage service 264 within archiving application 260 may communicate with storage service 234 from file router system 210. Storage service 264 may receive the file and/or the file retention plan and store the file and/or file retention plan in memory 280 according to the file retention plan.

In an embodiment, storage service 264 may interface with scheduler service 270. Scheduler service 270 may maintain and/or monitor retention periods associated with files stored in memory 280. Scheduler service 270 may note when a retention period has elapsed. When the retention period has elapsed or close to elapsing, scheduler service 270 may execute commands from the file retention plan corresponding to the file having the elapsed file retention period.

While scheduler service 270 may communicate with file router system 210 near the time that a file retention period will lapse, file router system 210 may send a retrieval command using retrieval service 236 prior to the file retention period lapsing. In an embodiment, retrieval service 236 may communicate with retrieval service 266 after receiving a request to access one or more stored files. Retrieval service 266 may access memory 280 to retrieve requested files. In an embodiment, retrieval service 266 may retrieve files according to file content identifiers provided by retrieval service 236. These file content identifiers may be, for example, a file type, a file identification, a date, and/or a range of dates. Retrieval service 266 may retrieve the file and/or the associated file retention plan from memory 280. Based on the configuration of the retrieval process, retrieval service 266 may return a copy of the file to retrieval service 236. Retrieval service 266 may allow a viewing of the stored filed but may prevent manipulation and/or editing of the stored file.

By accessing multiple data storage centers 250 in multiple geographic locations, file router system 210 may manage the storage and retrieval of different files and/or file retention plans. File router system 210 may provide a file management service for cloud computing platforms to aid in adherence to file storage rules. At times, these storage rules may be defined by an administrator or by a government authority, but using file router system 210 allows for streamlined file retention across multiple data storage centers 250.

Figure 3:
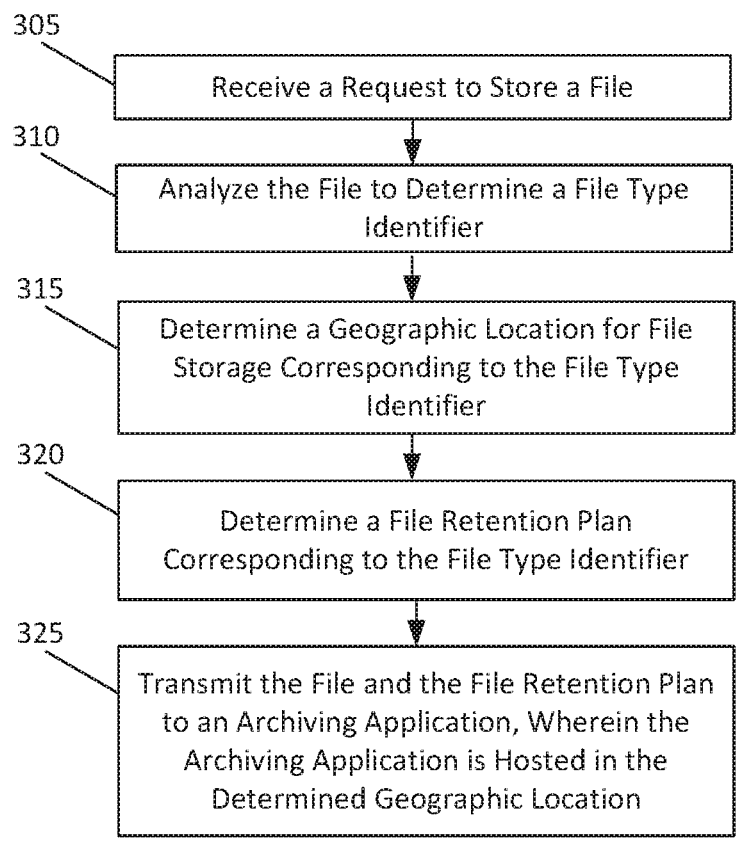
FIG. 3 depicts a flowchart illustrating a method for routing a file, according to some embodiments.

FIG. 3 depicts a flowchart illustrating a method 300 for routing a file, according to some embodiments. Method 300 shall be described with reference to FIG. 1; however, method 300 is not limited to that example embodiment.

In an embodiment, file router system 110 may utilize method 300 to route a file to a particular geographic location. The foregoing description will describe an embodiment of the execution of method 300 with respect to file router system 110. While method 300 is described with reference to file router system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 305, file router system 110 may receive a request to store a file.

File router system 110 may receive a request from an application 120 and/or a cloud computing engine 130. The request may be a query command. The request may be the file itself. That is, when file router system 110 receives a file, file router system 110 may recognize the request to store the file.

At 310, file router system 110 may analyze the file to determine a file content identifier. In an embodiment, a file content identifier may be a source location, content elements of the file, an identifier indicating the type of content contained within the file, a language associated with file, a file type and/or extension, metadata associated with the file, and/or other file identifiers indicating a classification of the file. The received request may indicate the file identifier and/or may indicate a geographic location for storing the file. For example, the request may state that the file should be stored in Germany.

In an embodiment, file router system 110 may analyze the file to determine a file content identifier. File router system 110 may analyze the file according to parameters specified by an administrator. For example, an administrator may define a parameter that assigns a retention period based on the file content. In a non-limiting example, a retention period of ten years may be assigned for document files including business transaction information. File router system 110 may be configured to identify the content of the file using machine learning and/or artificial intelligence and then determine the retention period and/or geographic storage location using the administrator defined parameters. In this manner, application 120C and/or cloud computing engine 130 may not specifically dictate a geographic location or a retention period, but file router system 110 may be able to supply the geographic location or the retention period. In an embodiment, the determined geographic location and/or retention period may adhere to government regulations for document archival.

At 315, file router system 110 may determine a geographic location for file storage corresponding to the file content identifier. At 320, file router system 110 may determine a file retention plan corresponding to the file content identifier. In an embodiment, an administrator may define mappings from a file content identifier to a geographic location and/or to a file retention plan.

For example, an administrator may generate mappings from file characteristics to a geographic location of file storage, a retention period, and/or a classification of the data. In this manner, an administrator may define rules and configurations to route files and/or retain files. In an embodiment, these location and/or retention period parameters may follow regulations defined by a government authority.

In a non-limiting example, an administrator may define a parameter stating that a German document will be routed to a data center hosted in Germany for storage and that the retention period for a German document is ten years. If a document having a source origin in Germany is received at 305, at 310, file router system 110 may recognize the German source origin as the file content identifier. At 315, file router system 110 may determine the geographic location for the file storage using this file content identifier. According to the defined parameter, file router system 110 may determine that the document should be stored at a data storage center 140 located in Germany. At 320, file router system 110 may determine a file retention plan for the document. In this case, the parameters state that the retention period for a German document is ten years. Thus, at 320, the retention plan may include a retention period of ten years.

In an embodiment, an administrator may define parameters according to policies defined within a company. These parameters may be arbitrary and/or may not follow a government-defined regulation. For example, an administrator may define a parameter that indicates a particular city rather than a country. An administrator may also define a retention period longer than a retention period specified by a regulation. In an embodiment where a regulation may specify a time period within which a file must be archived, the administrator may define an archiving queue time that causes the archiving to occur before the time period has elapsed. An administrator may also modify a parameter after defining an initial parameter.

In an embodiment, an administrator may define different parameters for different data types. For example, the location of storage and/or the retention period may differ depending on whether a file is an employment contract, employee personal information, or a transaction receipt. In a non-limiting example, an administrator may define a parameter routing employment contract files to a data storage center 140A located in City A. The administrator may also define a parameter routing transaction receipts to a data storage center 140B located in City B. In a non-limiting example, City A and City B may be located in the same country.

At 320, file router system 110 may determine a file retention plan corresponding to the file content identifier. The file retention plan may include a retention period, determining user identification information, and/or indicating a particular memory location for storing the file.

At 325, file router system 110 may transmit the file and the file retention plan to an archiving application, wherein the archiving application may be hosted in the determined geographic location. File router system 110 determined the geographic location at 315 corresponding to the file content identifier associated with the file. For example, a file source origin may be an indicator of where the file should be stored. In a non-limiting example, a multinational company may have employees in the United States and in Germany. The employees may utilize the same cloud computing platform to generate, manipulate, and/or save files. At 315, file router system 110 may determine a back-end data storage center 140A for storing files originating in the United States while utilizing data storage center 140B for files originating in Germany.

In an embodiment, the geographic location may be determined based on, for example, the content of the file and/or the file type. For example, file router system 110 may utilize machine learning and/or artificial intelligence techniques to determine the content of the file. In a non-limiting example, file router system 110 may direct the storage of business transaction receipts at data storage center 140A located in a first city while directing the storage of personal employee records to a data storage center 140B located in a second city. At 325, file router system 110 may transmit the file and the file retention plan to an archiving application hosted in the determined geographic location.

Figure 4:
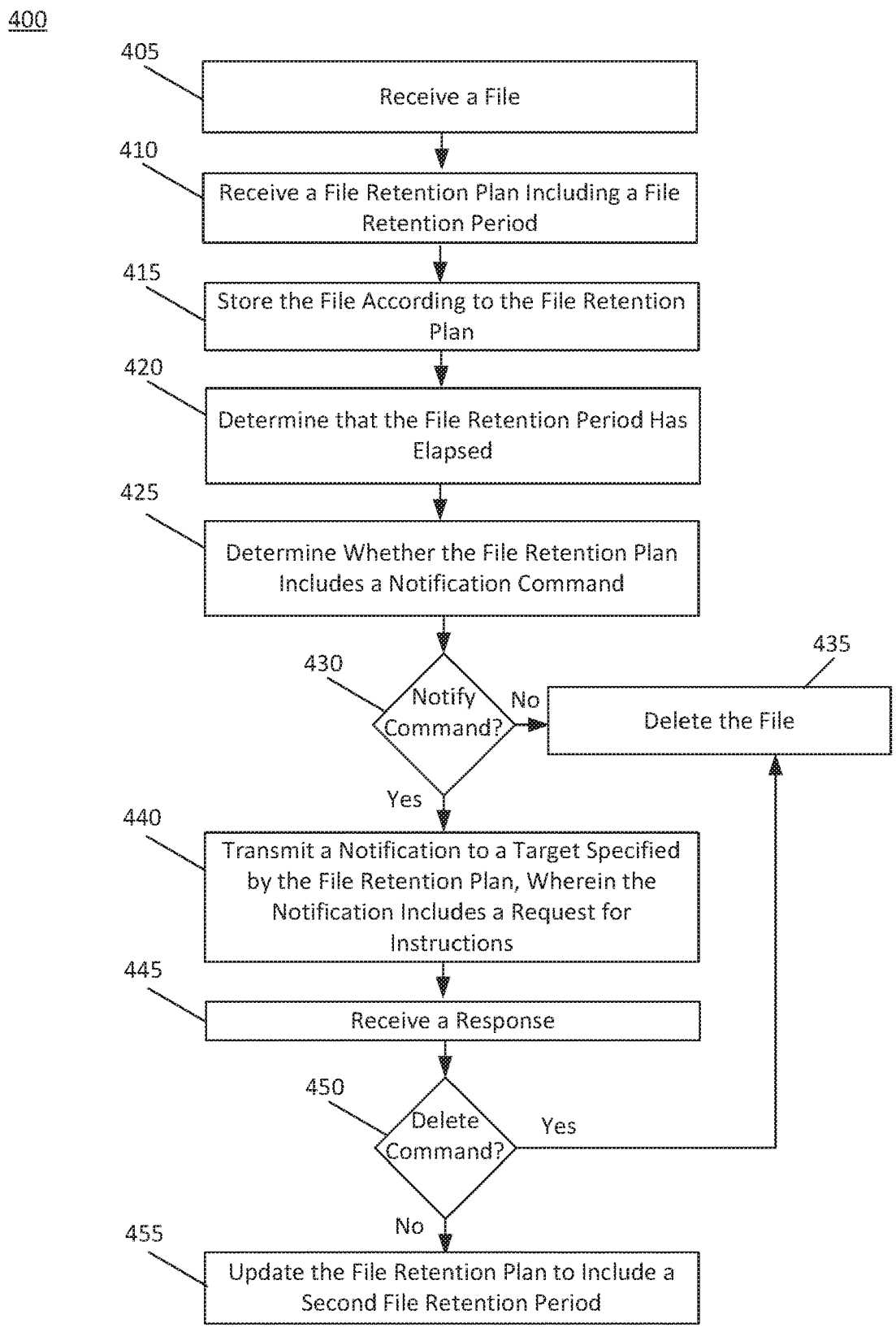
FIG. 4 depicts a flowchart illustrating a method for storing a file, according to some embodiments.

FIG. 4 depicts a flowchart illustrating a method 400 for storing a file, according to some embodiments. Method 400 shall be described with reference to FIG. 1; however, method 400 is not limited to that example embodiment.

In an embodiment, data storage center 140 may utilize method 400 to store a file according to a file retention plan. The foregoing description will describe an embodiment of the execution of method 400 with respect to data storage center 140. While method 400 is described with reference to data storage center 140, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 405, data storage center 140 may receive a file. At 410, data storage center 140 may receive a file retention plan including a file retention period. In an embodiment, the file and/or the file retention plan may be received from a file router system 110.

At 415, data storage center 140 may store the file according to the file retention plan. For example, the file retention plan may indicate a file retention period. Data storage center 140 may store the file in memory for the duration of the file retention period. In an embodiment, the file retention plan may specify the location of storage. For example, the file retention plan may indicate a particular memory space or memory partition. At 415, data storage center 140 may store the file in the indicated memory. The file retention plan may indicate a user identification associated with the file. For example, the file may have been uploaded to a file router system 110 using a user account. At 415, data storage center 140 may store the file with an indicator that the file is associated with the user account.

At 420, data storage center 140 may determine that the file retention period has elapsed. To determine that the file retention period has elapsed, data storage center 140 may generate a schedule to indicate when a retention period has elapsed. For example, a scheduler may record multiple retention periods for tracking. The multiple retention periods may correspond to multiple stored files. In an embodiment, using a scheduler, data storage center 140 may determine that a file retention period has elapsed asynchronously. Data storage center 140 may track time using a timer to determine that a file retention period has elapsed.

In an embodiment, a file retention plan may instruct data storage center 140 to generate a notification before the file retention period has elapsed. At 420, data storage center 140 may determine whether the specified earlier point in time has been reached.

At 425, data storage center 140 may determine whether the file retention plan includes a notification command. Data storage center 140 may retrieve the file retention plan from memory and/or access metadata associated with the file.

At 430, if the file retention plan does not include a notification command, data storage center 140 may delete the file at 435. For example, if a file retention plan has not been stored (e.g., if data storage center 140 checks the memory and does not locate a file retention plan), data storage center 140 may delete the file at 435. The deletion of the file at 435 may represent the lapsing of the retention period. This deletion may indicate that the file has been archived for the amount of time specified by an administrator and/or by a government authority.

Returning to 430, if the file retention plan includes a notification command, at 440, the data storage center 140 may transmit a notification to a target specified by the file retention plan. The target may be an administrator or a user specified by the file retention plan. In an embodiment, the user may be the user who created the file. In an embodiment, the target may be an electronic mailbox address corresponding to the administrator or the user. The notification may include a request for instructions. The presence of a notification command in the file retention plan may indicate the desire of the user or administrator that defined the routing parameters to be notified of the lapsing of a retention period. In this manner, the user and/or administrator may decide the subsequent action for handling the file.

At 445, the data storage center 140 may receive a response. The response may include instructions for further processing of the file. In an embodiment, the notification may be a prompt including one or more buttons to be displayed on a graphical user interface accessible via an application 120, a cloud computing engine 130, and/or a file routing system 110. The response may be a user or administrator interaction with the displayed prompt. In an embodiment, the response may be an indication of whether to retain the file and/or delete the file.

At 450, if the response received in 445 includes a command or instructions to delete the file, then data storage center 140 may delete the file at 435. For example, data storage center 140 may delete the file in response to explicit instructions to delete the file. If delete instructions are not received, data storage center 140 may operate according to a default action to retain the file. In this manner, data storage center 140 may avoid inadvertently deleting a file without first receiving instructions.

Referring again to 450, if the response received in 445 does not include a command or instructions to delete the file, then at 455, data storage center 140 may update the file retention plan to include a second file retention period. For example, data storage center 140 may supply a default extension if instructions to delete the file are not received. In a non-limiting example, data storage center 140 may extend the retention period for a week. Data storage center 140 may transmit another notification during this second file retention period and/or when the second file retention period has elapsed.

In an embodiment, the response received at 445 may include a command to extend the file retention period, and may specify the second file retention period. For example, a user and/or administrator may supply a command to extend the file retention period for a set amount of time and/or to store the file indefinitely.

In an embodiment, to update the file retention plan, data storage center 140 may update metadata associated with the file. In an embodiment, data storage center 140 may update a scheduler index to designate the second file retention period.

Using method 400, a data storage center 140 may be able to store files as well as manage files for different duration periods. The data storage centers 140 may be remote from file router system 110 and/or applications 120A-120C and cloud computing engine 130. This configuration may allow for a front-end processing of information performed by file router system 110 to determine the particular data storage center 140A-140B to route a file and/or a file retention plan. The determined data storage center 140 may then store the file according to the specifications of the file retention plan.

Figure 5:
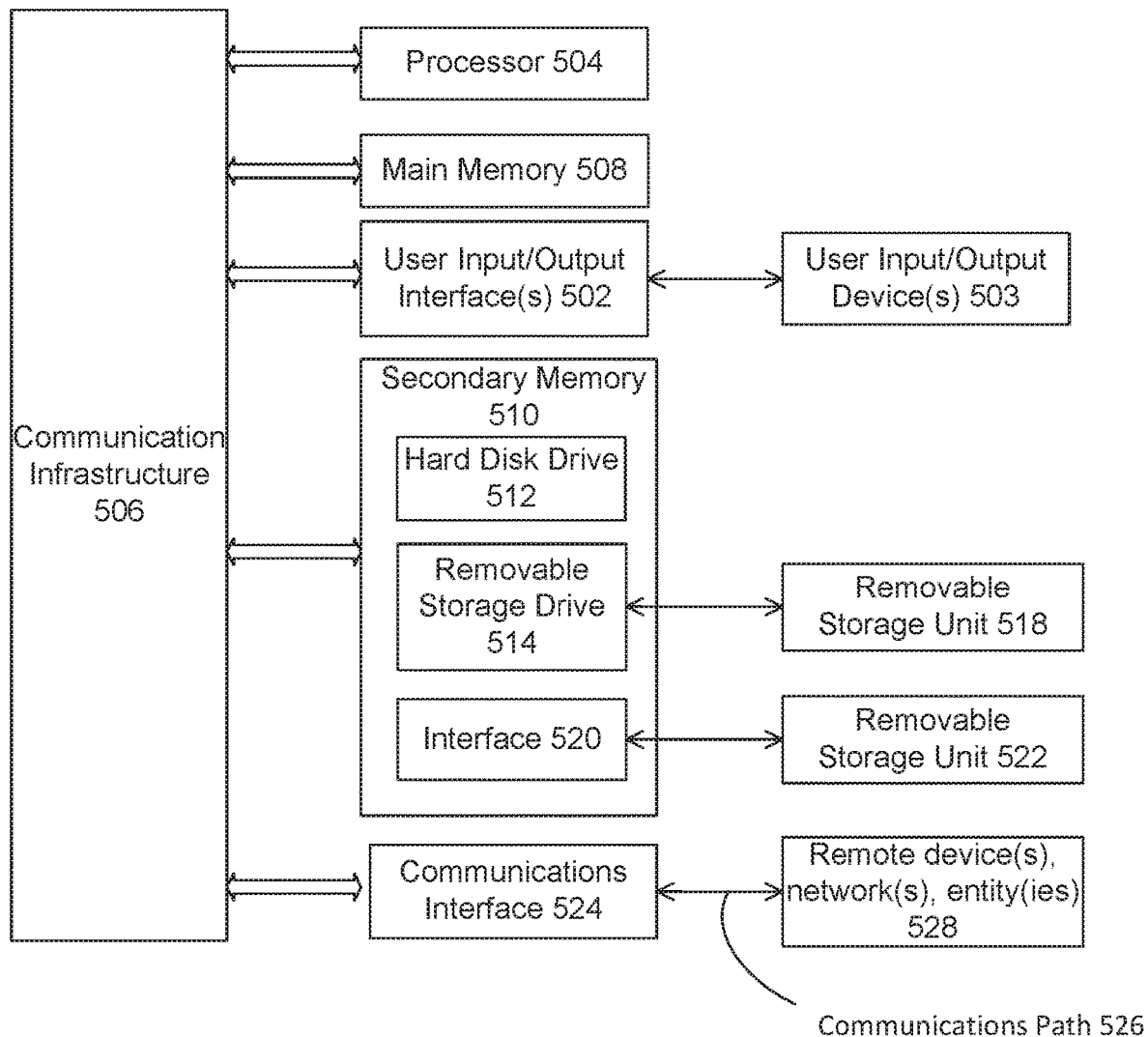
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by a file router system, a file;
   analyzing, by the file router system, the file to determine a file content identifier;
   determining, by the file router system, a geographic location for file storage corresponding to the file content identifier using mapping rules;
   determining, by the file router system, a file retention plan corresponding to the file content identifier using the mapping rules; and
   transmitting, by the file router system, the file and the file retention plan to an archiving application of a data storage center, wherein the data storage center is in the geographic location.

2. The computer-implemented method of claim 1, the receiving further comprising:
   receiving the file from a cloud computing platform.

3. The computer-implemented method of claim 1, the determining the file retention plan further comprising:
   determining a file retention period using the mapping rules, wherein the mapping rules associate the file content identifier to the file retention period.

4. The computer-implemented method of claim 3, wherein the file retention period corresponds to a government regulation.

5. The computer-implemented method of claim 1, the analyzing further comprising:
identifying a geographic source location for the file.

6. The computer-implemented method of claim 1, the analyzing further comprising:
identifying a classification of content within the file.

7. The computer-implemented method of claim 1, further comprising:
receiving a notification from the archiving application indicating that a file retention period has elapsed; and
transmitting the notification to an administrator of the file.

8. A system, comprising:
a memory; and
at least one processor coupled to the memory, the at least one processor configured to:
receive a file;
analyze the file to determine a file content identifier;
determine a geographic location for file storage corresponding to the file content identifier using mapping rules;
determine a file retention plan corresponding to the file content identifier using the mapping rules; and
transmit the file and the file retention plan to an archiving application of a data storage center, wherein the the data storage center is in the geographic location.

9. The system of claim 8, wherein to receive the file, the at least one processor is further configured to:
receive the file from a cloud computing platform.

10. The system of claim 8, wherein to determine the file retention plan, the at least one processor is further configured to:
determine a file retention period using the mapping rules, wherein the mapping rules associate the file content identifier to the file retention period.

11. The system of claim 10, wherein the file retention period corresponds to a government regulation.

12. The system of claim 8, wherein to analyze the file, the at least one processor is further configured to:
identify a geographic source location for the file.

13. The system of claim 8, wherein to analyze the file, the at least one processor is further configured to:
identify a classification of content within the file.

14. The system of claim 8, wherein the at least one processor is further configured to:
receive a notification from the archiving application indicating that a file retention period has elapsed; and
transmit the notification to an administrator of the file.

15. A non-transitory computer-readable device having instructions stored thereon that, when executed by at least one computing device, cause the at least one computing device to perform operations comprising:
receiving a file;
analyzing the file to determine a file content identifier;
determining a geographic location for file storage corresponding to the file content identifier using mapping rules;
determining a file retention plan corresponding to the file content identifier using the mapping rules; and
transmitting the file and the file retention plan to an archiving application of a data storage center, wherein the data storage center is in the geographic location.

16. The non-transitory computer-readable device of claim 15, the receiving further comprising:
receiving the file from a cloud computing platform.

17. The non-transitory computer-readable device of claim 15, the determining the file retention plan further comprising:
determining a file retention period using the mapping rules, wherein the mapping rules associate the file content identifier to the file retention period and wherein the file retention period corresponds to a government regulation.

18. The non-transitory computer-readable device of claim 15, the analyzing further comprising:
identifying a geographic source location for the file.

19. The non-transitory computer-readable device of claim 15, the analyzing further comprising:
identifying a classification of content within the file.

20. The non-transitory computer-readable device of claim 15, the operations further comprising:
receiving a notification from the archiving application indicating that a file retention period has elapsed; and
transmitting the notification to an administrator of the file.

* * * * *